(No Model.) 10 Sheets—Sheet 1.
E. GRABER & L. HEPWORTH.
RULING MACHINE.

No. 589,827. Patented Sept. 14, 1897.

WITNESSES: INVENTORS.
A. Millward Flack. Ellis Graber & Lewis Hepworth.
Alfred H. Broad. Per Robert E. Phillips.
Attorney.

(No Model.)  
10 Sheets—Sheet 3.

E. GRABER & L. HEPWORTH.
RULING MACHINE.

No. 589,827.  
Patented Sept. 14, 1897.

WITNESSES:  
A. Millward Flack.  
Alfred H. Broad.

INVENTORS.  
Ellis Graber & Lewis Hepworth.  
Per Robert E. Phillips  
Attorney.

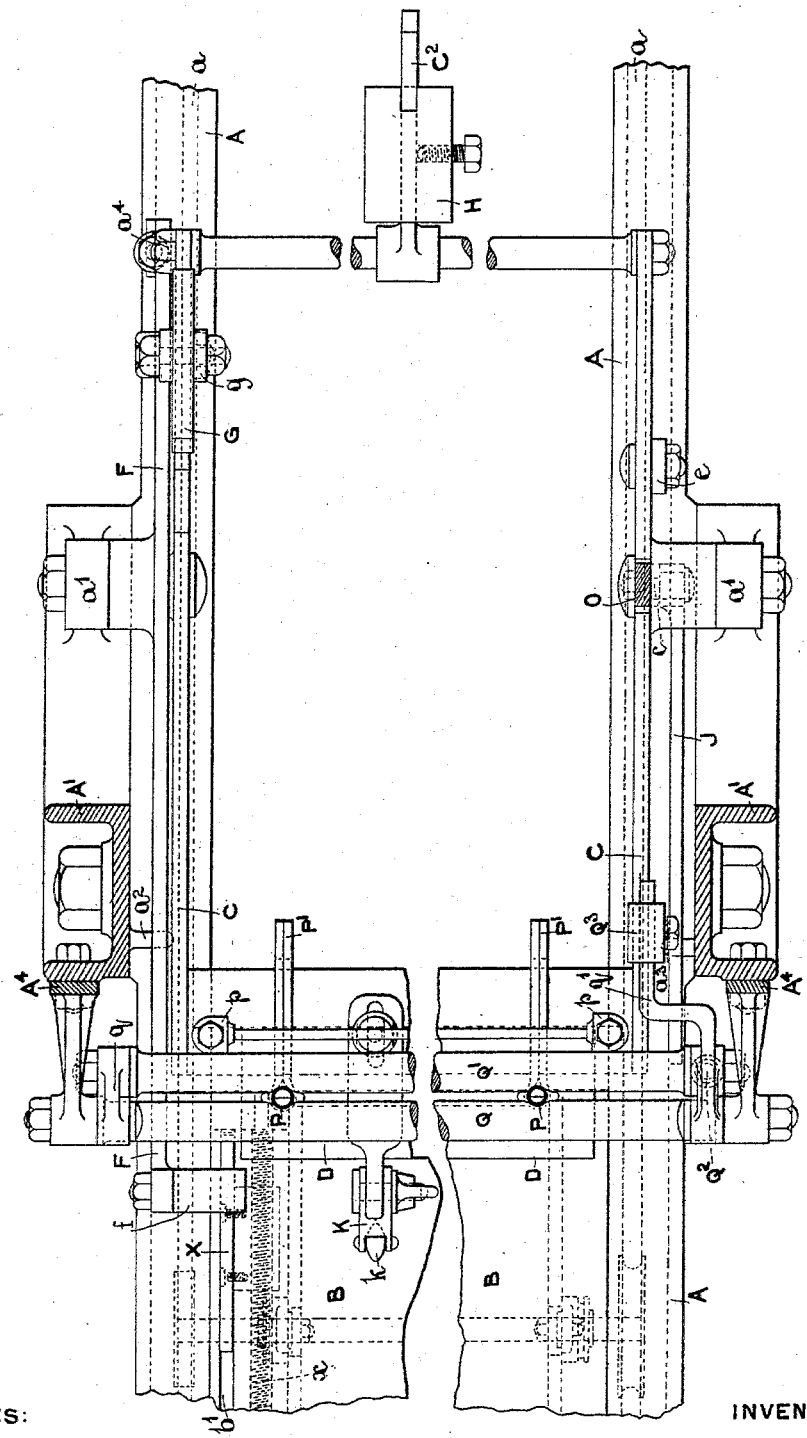

(No Model.) 10 Sheets—Sheet 5.
E. GRABER & L. HEPWORTH.
RULING MACHINE.
No. 589,827. Patented Sept. 14, 1897.
Fig. 6.
Fig. 6.<sup>A</sup>
Fig. 8.
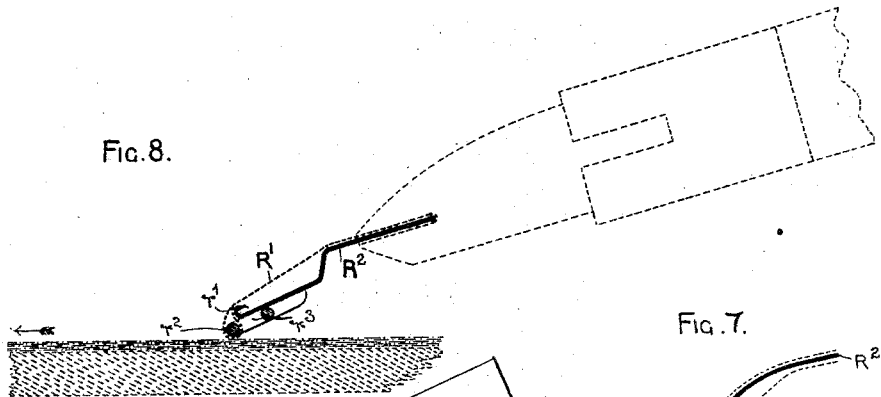
Fig. 7.
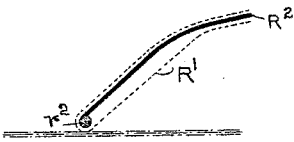
Fig. 9.
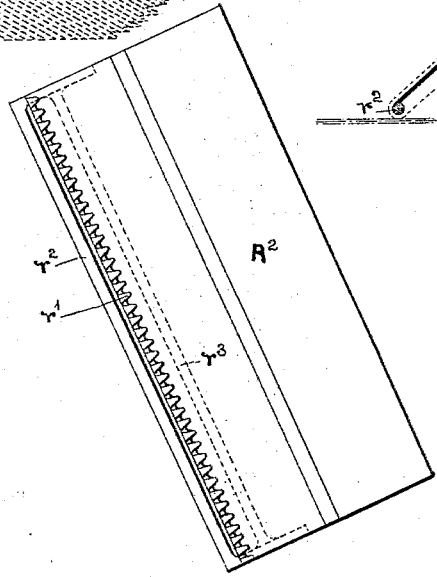
WITNESSES:
A. Millward Flack.
Alfred K. Croad.
INVENTORS.
Ellis Graber & Lewis Hepworth.
Per Robert C. Phillips
Attorney.

(No Model.) 10 Sheets—Sheet 6.
E. GRABER & L. HEPWORTH.
RULING MACHINE.
No. 589,827. Patented Sept. 14, 1897.
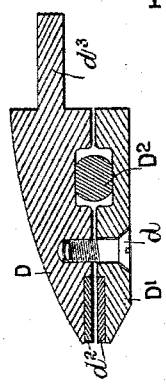
Fig. 11.
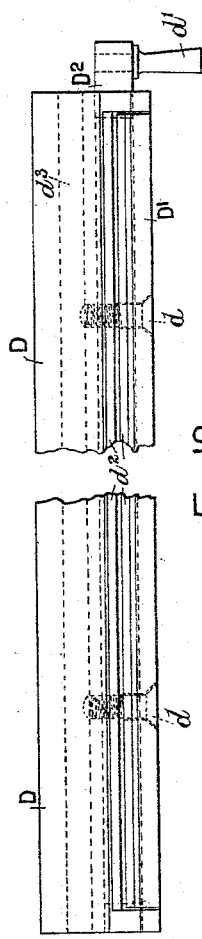
Fig. 10.
Fig. 12.
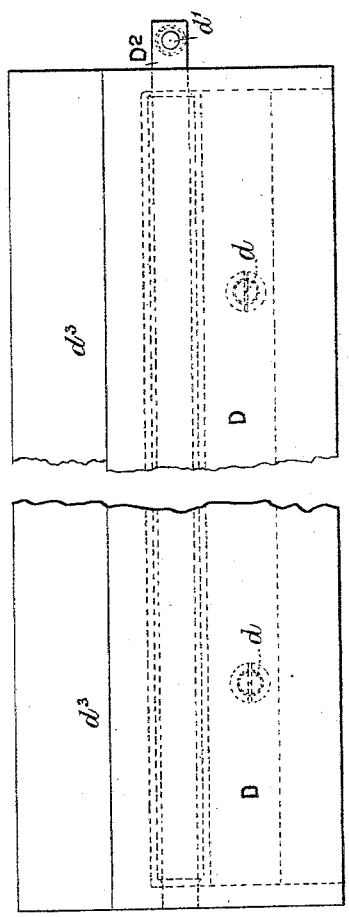
WITNESSES:
A. Millward Flack.
Alfred K. Croad.
INVENTORS.
Ellis Graber & Lewis Hepworth
Per Robert E. Phillips
Attorney.

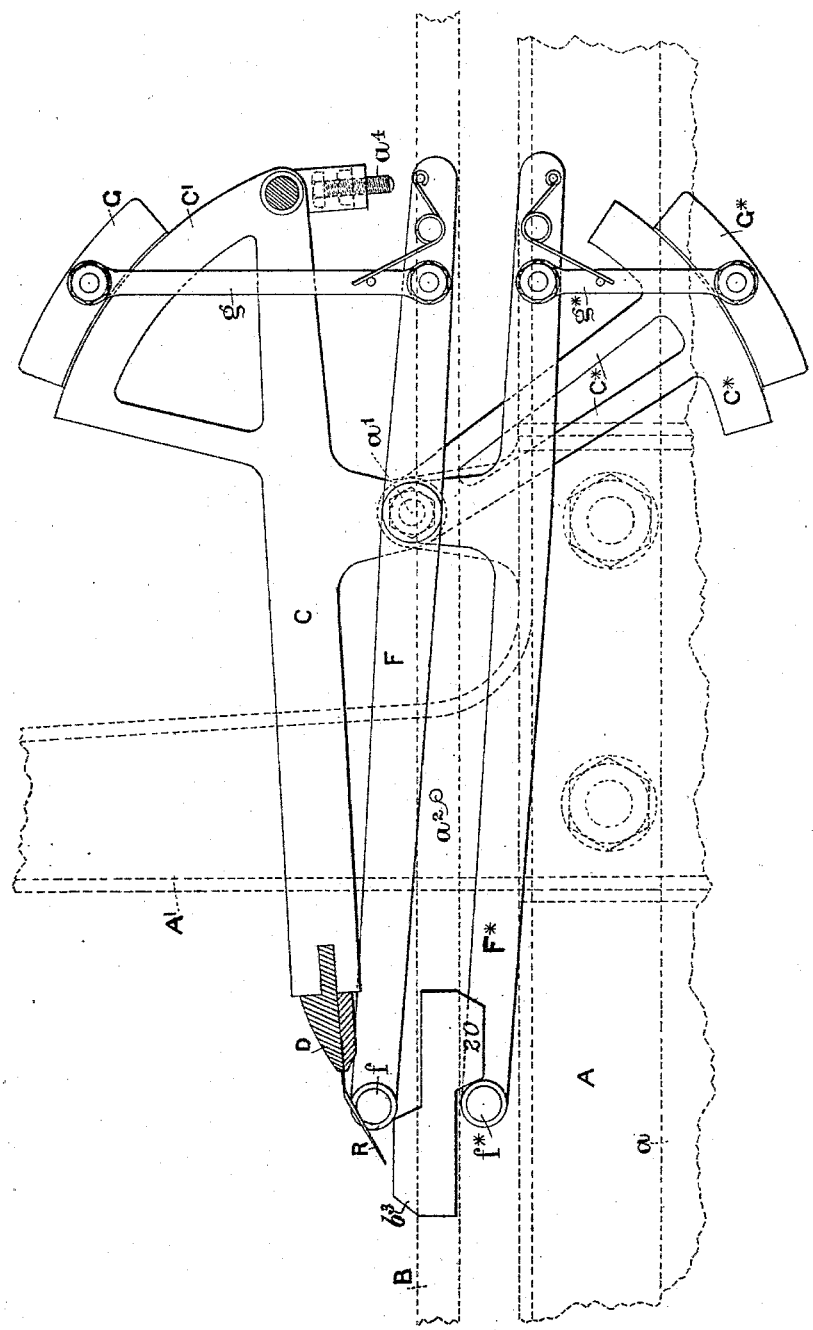

(No Model.)  10 Sheets—Sheet 8.
E. GRABER & L. HEPWORTH.
RULING MACHINE.
No. 589,827.  Patented Sept. 14, 1897.
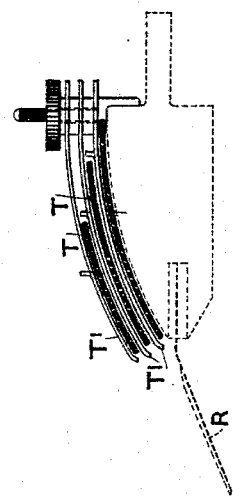
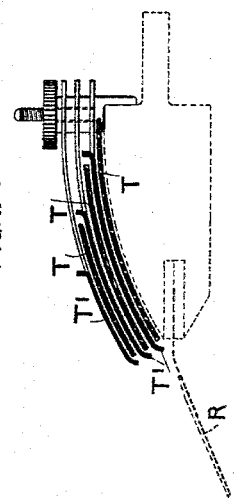
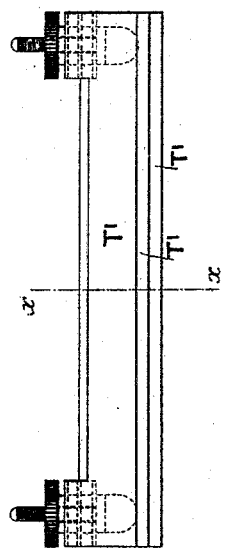
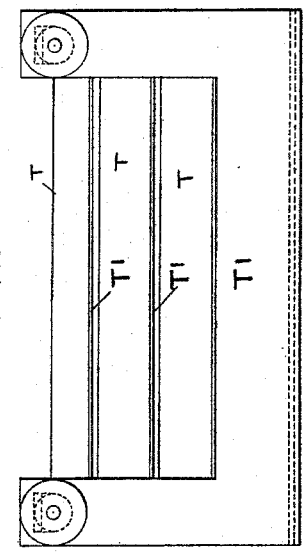
WITNESSES:  INVENTORS.

(No Model.) 10 Sheets—Sheet 9.

E. GRABER & L. HEPWORTH.
RULING MACHINE.

No. 589,827. Patented Sept. 14, 1897.

WITNESSES:
A. Millward Flack
Alfred K. Croad.

INVENTORS.
Ellis Graber & Lewis Hepworth.
Per T. Robert C. Phillips
Attorney.

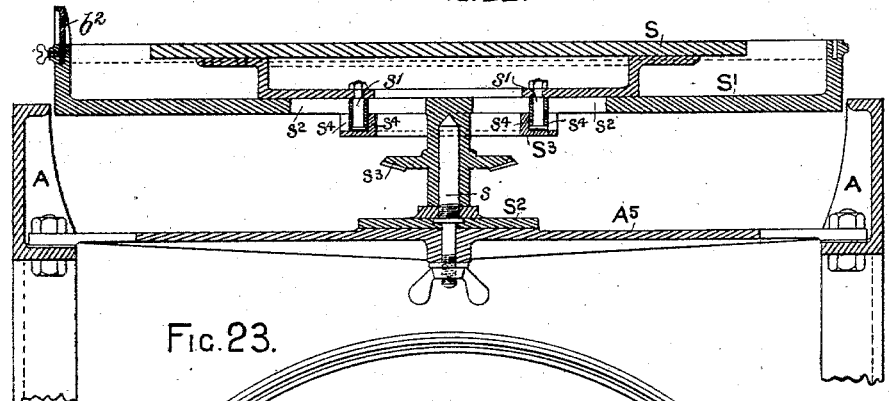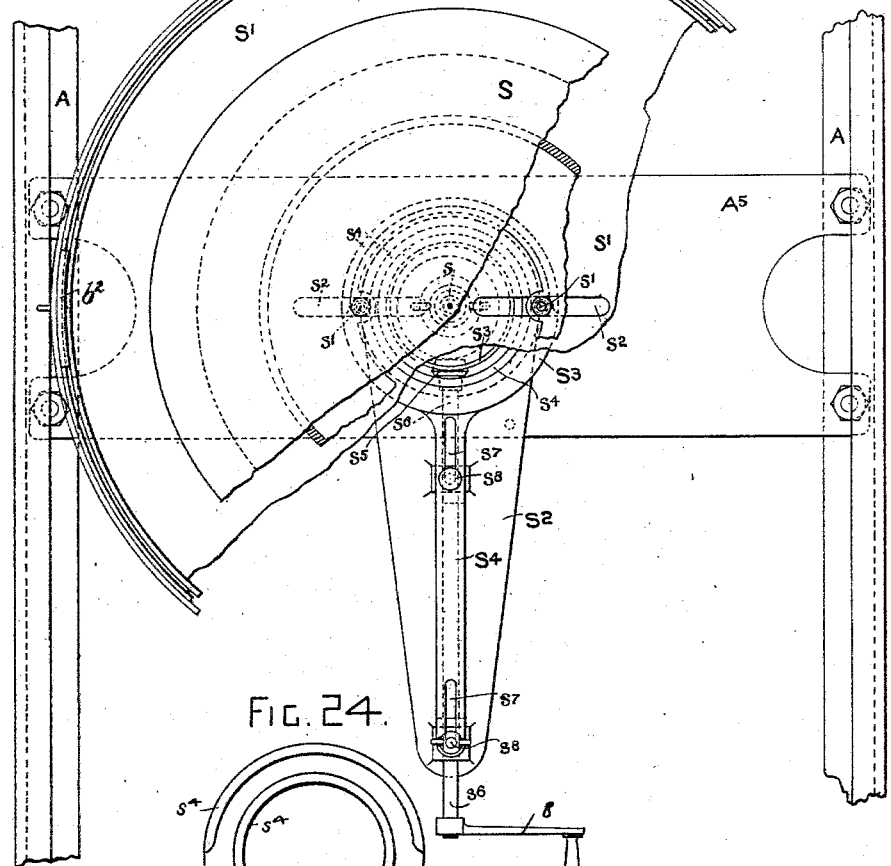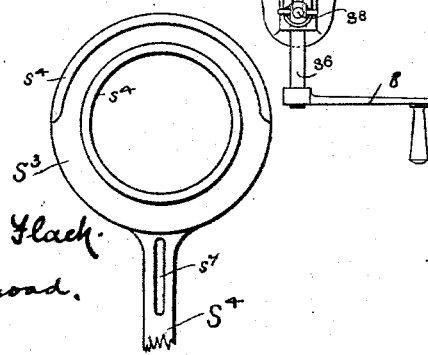

UNITED STATES PATENT OFFICE.

ELLIS GRABER AND LEWIS HEPWORTH, OF TUNBRIDGE WELLS, ENGLAND.

RULING-MACHINE.

SPECIFICATION forming part of Letters Patent No. 589,827, dated September 14, 1897.

Application filed February 29, 1896. Serial No. 581,269. (No model.) Patented in England June 19, 1894, No. 11,858, and in France August 17, 1895, Nos. 249,669 and 249,673.

*To all whom it may concern:*

Be it known that we, ELLIS GRABER and LEWIS HEPWORTH, subjects of the Queen of Great Britain, residing at Tunbridge Wells, in the county of Kent, England, have invented a new and useful Ruling-Machine, (for which we have obtained Letters Patent in Great Britain, No. 11,858, bearing date the 19th of June, 1894, and in France, Nos. 249,669 and 249,673, bearing date the 17th of August, 1895,) of which the following is a full and complete specification.

This invention relates to ruling-machines; and it consists in the novel construction and combination of the parts hereinafter fully described and claimed.

Figure 1:
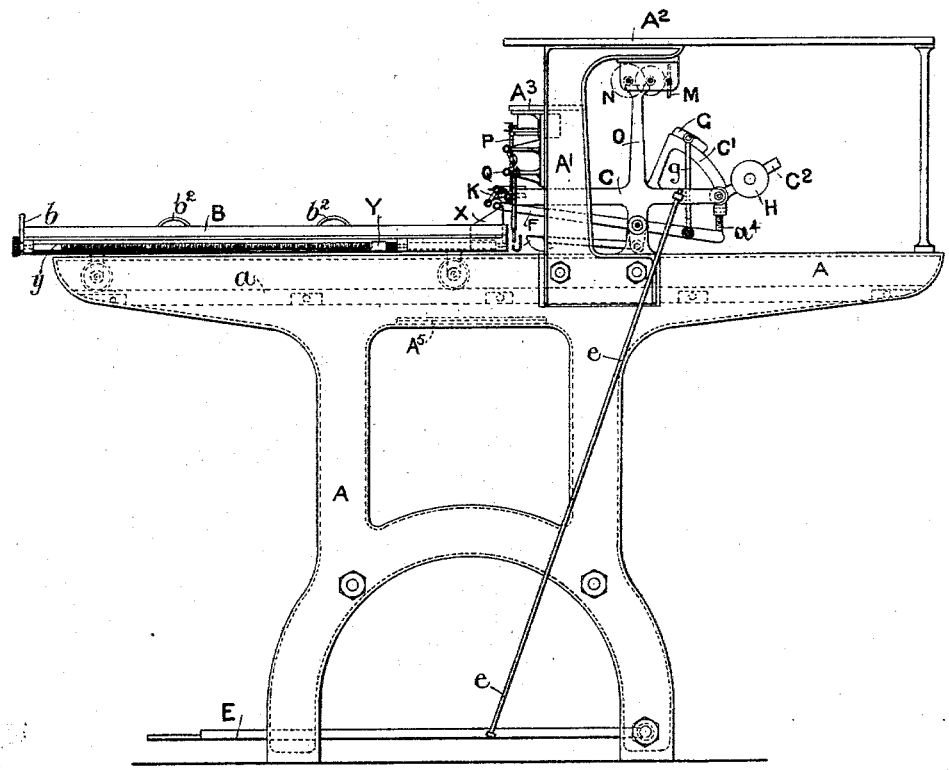
Figure 2:
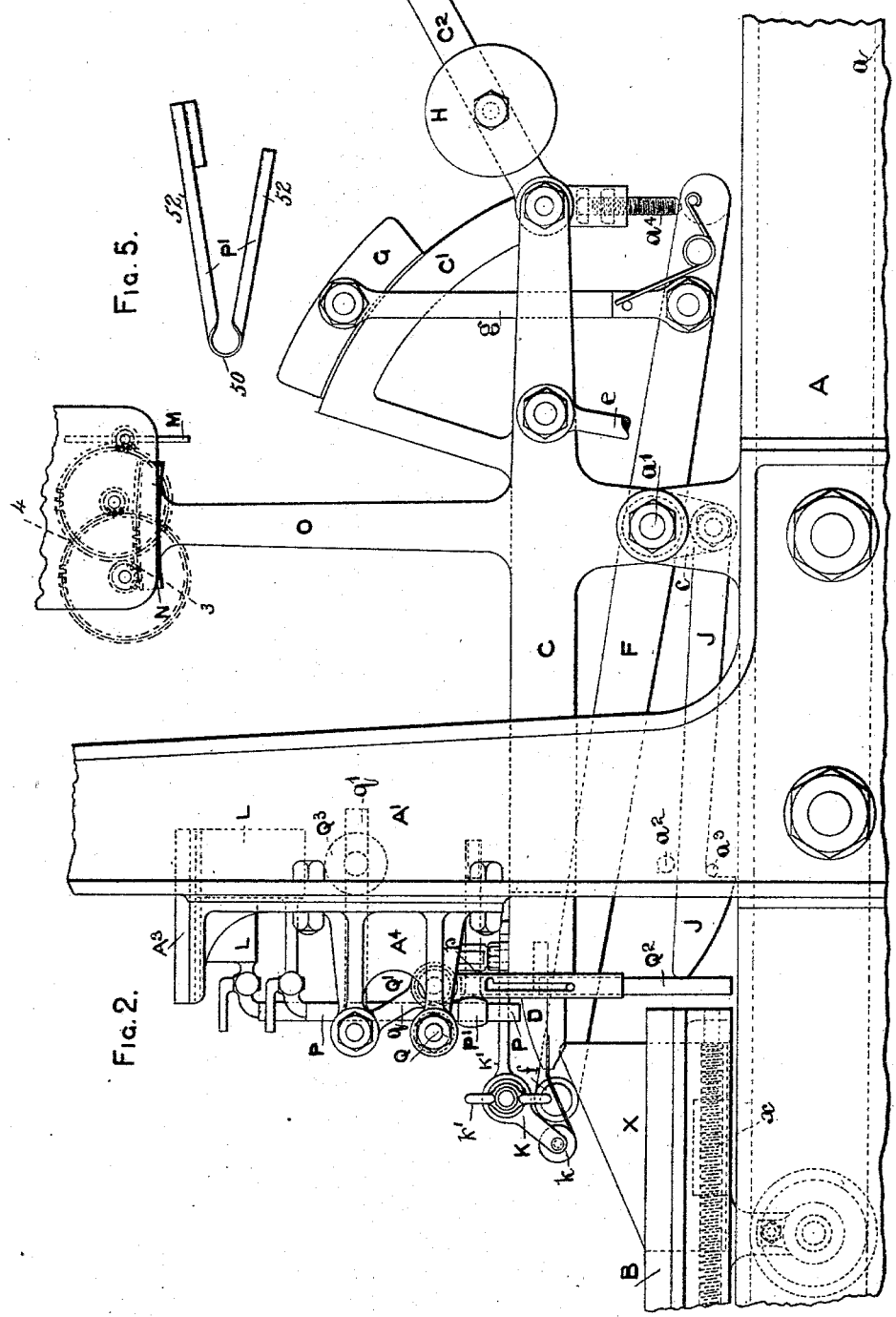
Figure 3:
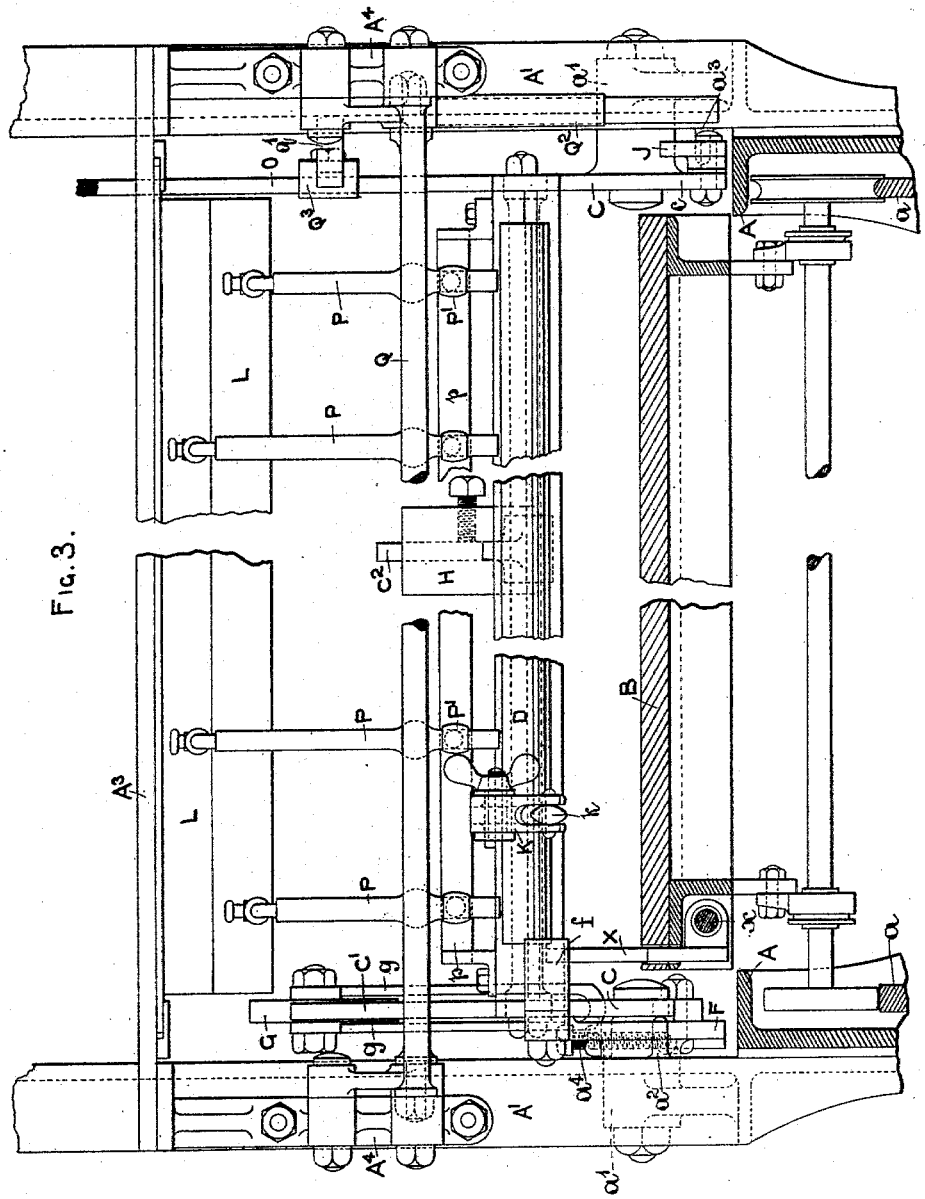
Figure 20:
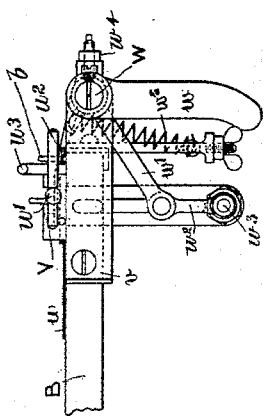
Figure 21:
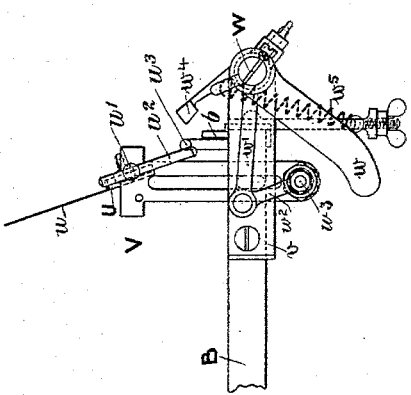
Figure 18:
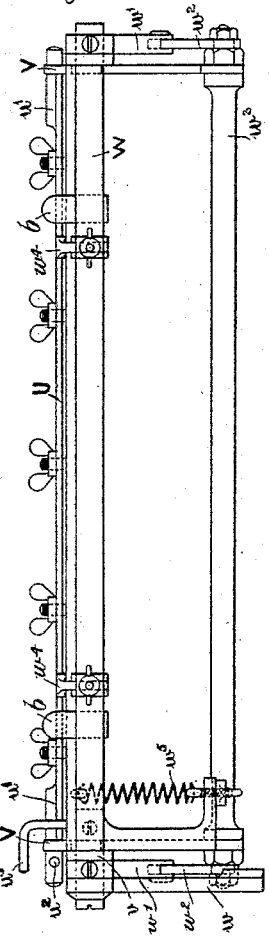
Figure 19:
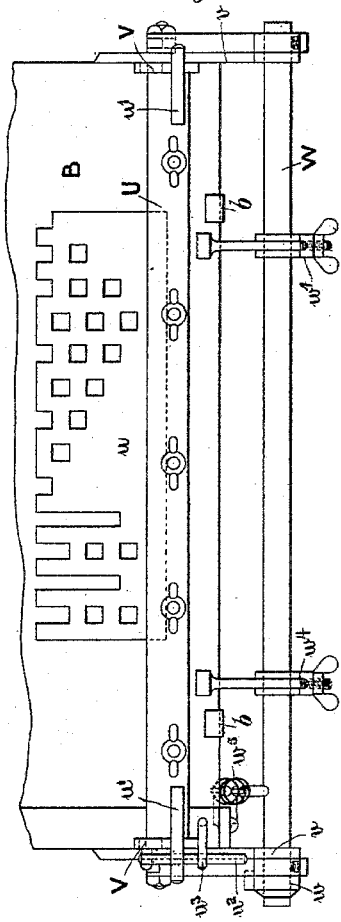

In the drawings, Figure 1 is a side view of the machine. Fig. 2 is a side view of the pen-beam and the parts coacting with it. Fig. 3 is a front view, and Fig. 4 is a plan view, of the parts shown in Fig. 2. Fig. 5 is a detail view of one of the spring-fingers P'. Fig. 6 is a longitudinal section through a pen for ruling narrow lines. Fig. 6$^A$ is a similar section showing a modification of the pen shown in Fig. 6. Fig. 7 is a longitudinal section through a pen for ruling broad lines. Fig. 8 is a similar longitudinal section showing a modification of the pen shown in Fig. 7. Fig. 9 is a plan view of a portion of the pen shown in Fig. 8. Fig. 10 is a front view of the penholder. Fig. 11 is a cross-section through the penholder. Fig. 12 is a plan view of the penholder. Fig. 13 is a side view showing a modification of the clutch mechanism for actuating the pen-beam. Fig. 14 is a front view of the ink-pad masks. Fig. 15 is a cross-section taken on the line $xx$ in Fig. 14. Fig. 16 is a plan view of the ink-pad masks, and Fig. 17 is an end view of the same. Fig. 18 is a front view of the stencil-plate holder. Fig. 19 is a plan view of the same. Figs. 20 and 21 are end views of the stencil-plate holder, showing it in its lowered and raised positions, respectively. Fig. 22 is a cross-section through the revoluble table. Fig. 23 is a plan view of the same with some portions of it broken away. Fig. 24 is a detail plan view of the guide-ring for making eccentric curved lines.

A is the frame of the machine, and A' are brackets secured thereto and supporting a table A$^2$.

C is the pen-beam, formed of two parts suitably braced together. This pen-beam is pivoted on pins $a'$, projecting from the frame A.

D D' is the penholder, secured to the front portion of the pen-beam. The pen-beam is rocked on its pivots to raise or lower the pens by means of the treadle E, pivoted to the frame, and the connecting-rod $e$.

The paper to be ruled is placed on a movable table supported by the frame under the ruling-pens. Motion is imparted to the table so that the paper is moved under the pens and in contact with them, and the lines ruled on the paper are straight or curved, according to the direction in which the table is moved.

B is a table provided with rollers, which run on guides $a$ on the frame. This table is reciprocated longitudinally, so that straight lines are ruled on the paper which rests on it. A stop $b$ is provided at one end of the table for the paper to bear against.

F is a striker for raising the pen-beam automatically. This striker is pivoted on one of the pins $a'$ and is provided at its front end with a roller $f$. Adjustable tappets $b^2$ are arranged in a longitudinal slot $b'$ of the table B for raising the said roller. The rear end of the striker is connected to the rear end of the pen-beam by means of clutch mechanism comprising a spring-pressed arm $g$, which is pivoted to the beam and provided with a pivoted curved block G, which bears on a quadrant C', secured to the pen-beam. When the roller $f$ is raised, the block G depresses the pen-beam by frictional contact with the quadrant C', but the pen-beam can be raised independent of the striker, and it can be held in its raised position independent of the striker. The front end of the pen-beam drops by gravity when the roller is clear of the tappets.

In order to insure the rapid movement of the pen-beam so that the pens may engage accurately with the paper, the tappet and striker mechanism may be duplicated in a reversed position, as shown in Fig. 13, the duplicated parts being marked F*, G*, $g$*, and $f$*, instead of F, G, $g$, and $f$. The tappet $b^3$ is constructed double, so that when the upper part of it in being moved forward leaves the roller $f$ and permits it to drop the lower part 20 of it engages with the roller $f^*$ and forces the pen downward.

A stop $a^2$ projects from one of the brackets A' and prevents the roller $f$ from falling onto the table, being arranged under the striker.

The position of the striker with respect to the beam is regulated by a set-screw $a^4$ carried by the end portion of the beam. The point of this set-screw bears against the rear end portion of the striker.

X is a tappet which is adjustable in a slot $b'$ in the table and which raises the pen-beam when the end of the paper passes from under the pens. The position of the tappet X is adjusted by means of a screw journaled in the table B and operated from its front end.

A weight H is secured on an arm $C^2$, projecting rearwardly from the pen-beam, for the purpose of partially balancing it and preventing the pens from dropping too hard on the paper.

J is a hooked catch pivoted to an arm $c$ on the lower part of the pen-beam. This catch engages with a pin $a^3$, projecting from one of the brackets A', when the pen-beam has been raised above a certain height and prevents it from dropping back until the front hooked end of the catch has been raised clear of the pin. A tappet-finger Y is carried by the table B and is provided with a screw $y$ for adjusting its position. The finger Y strikes the front end portion of the catch J and raises it clear of the pin. The position of this finger determines the point at which the ruling of lines on the paper commences, as the pens drop onto the paper as soon as the catch is raised.

An arm K is pivoted to the front end of an arm K', secured to the front part of the pen-beam, and $k'$ is a thumb-screw for clamping the arm K after its position has been adjusted. The arm K carries a roller $k$, which runs on the paper in front of the pens and prevents the pens from bearing hard on the paper.

The descent of the pens onto the paper is regulated by a fly M, supported from one of the brackets A'. A vertical arm O on the pen-beam is provided with a toothed rack 3, and 4 is a train of toothed wheels operatively connecting the fly with the said rack. The toothed rack 3 is curved and is arranged concentric with the pivots $a'$, which support the pen-beam.

The devices for supplying ink of different colors to the ink-pads consist of ink-reservoirs L, to which flexible tubes P are attached. The reservoirs are supported by a table $A^3$, secured to the brackets A'. The tubes P pass between two bars Q and Q'. The bar Q is stationary, being secured transversely in brackets $A^4$, secured to the brackets A'. The bar Q' is carried by arms $q$, pivoted to the brackets $A^4$, and is provided with a weight $Q^3$, secured on an arm $q'$, for pressing the bar Q' against the tubes, so that the passage through them is normally held closed.

$Q^2$ is an arm depending from one of the arms $q$ in the path of the tappet-finger Y, hereinbefore described. When the finger Y strikes the depending arm, it releases the tubes and allows ink to pass through them onto the pads.

P' are guides for the tubes. These guides are spring-fingers which engage with holes in a bar $p$, carried by the pen-beam. Each guide is formed of a band of metal, as shown in Fig. 5, bent to fit around the tube at 50 and having its end portions 52 longitudinally straight and bent transversely, so as to be both slidable longitudinally and revoluble axially in a hole in the bar $p$. The elasticity of the guide holds it in position in the bar and also holds the tube in position. These guides are placed in any desired position, so that the tubes may deliver the ink at any desired point.

R is a pen for ruling narrow lines. This pen is of sheet metal and tapers to its ruling-point $r$. In the modification shown in Fig. $6^A$ the pen is provided with a stiffening-rib.

The pen for ruling broad lines consists of a sheet-metal plate $R^2$, having an enlargement or bar $r^2$ at its ruling-point and a piece of absorbent material R', such as felt, stretched over the said enlargement and secured to the pen under tension. The enlargement holds the rounded surface of the felt, which applies the ink, in a position enabling it to draw a line of even color and without ragged edges. The ends of the felt may be secured to the pen in any approved manner.

In the modification shown in Fig. 8 the front edge of the plate $R^2$ is turned up and is provided with teeth $r'$. The enlargement or bar $r^2$ is secured to the plate $R^2$ by strips $r^3$. The plate $R^2$ may be strengthened by a cross-rib, if desired, on its under surface. The felt engages with the teeth $r'$ and is passed under the enlargement or bar $r^2$ and is secured to the top of the plate R' by the penholder. The felt is secured under a slight tension, so that it lies evenly and smoothly upon the part $r^2$.

The penholder consists of two plates D and D', pivotally connected at about their middle portions. Any approved means may be used for pivotally connecting these plates, but by preference set-screws $d$ are used. These set-screws have countersunk heads and engage loosely with holes in the plate D', the points of the set-screws being screwed into holes in the plate D. Jaws $d^2$, of soft material, such as india-rubber, are secured to the plates for engaging with the pens. An eccentric-bar $D^2$ is journaled in lugs on the ends of the plate D and works in recesses in the said plates. A handle $d'$ is provided on the end of the eccentric-bar for operating it. A lug $d^3$ is provided on the plate D and is secured to the pen-beam in any approved manner.

The plates are adjusted by turning the screws $d$, and all the pens are clamped or unclamped by a movement of the eccentric bar, which causes the lower plate to rock pivotally on the said screws.

In order to enable lines of different color to be ruled in close proximity to each other, pads T, of absorbent material, are placed one above the other on top of the penholder and masks T' are placed between the said pads. Each mask is narrower than the pad next below it, so that a portion of the surface of each pad is exposed on which ink can be deposited by means of the feed-tubes, hereinbefore described. The ink is conducted from the pads to the pens by means of pieces of wool or worsted in the usual manner.

A stencil-plate $u$ is provided having holes for forming a pattern. The pens slide on the stencil-plate and mark the paper through the said holes.

U is a clamp of approved construction for holding the stencil-plate at the front end of the table B. This clamp is provided with pivots $u'$, which are journaled in brackets V. The brackets V are slidable vertically in slots in the sides of the table B and are held in the slots by cover-plates $v$. The cover-plates $v$ have a shaft W journaled in them in front of the stencil-plate.

The shaft W is provided with arms $w'$, which are pivotally connected to the brackets V by links $w^2$. A rod $w^3$ is arranged between the brackets V, and the links are pivoted on the ends of this rod. An arm $w$ is secured to one end of the shaft W in the path of a tappet (not shown) which is secured to the frame A. One of the pivots $u'$ has a transverse pin $u^2$, which strikes against the tappet $u^3$, secured to the table B. When the arm $w$ strikes the tappet, the brackets V are raised from the position shown in Fig. 20 to the position shown in Fig. 21, and the pin $u^2$ strikes the tappet $u^3$ and tilts up the stencil-plate, so that the top sheet of paper may be removed. The stencil-plate is normally pressed down on the paper by means of a spring $w^5$.

Fingers $w^4$ are secured to the shaft W and bear on the paper when the stencil-plate is depressed, so that the paper is clamped to the table while being ruled.

The reciprocatory table B is used for ruling straight lines, and when curved lines are to be ruled the table B is removed and a revoluble table of approved construction is substituted for it.

In order to enable curves of various forms to be drawn, the revoluble table is made in two parts S and S'. The part S' is larger than the part S and has a groove in its edge for carrying the tappets $b^2$, which operate the striker, as hereinbefore described. The part S' is pivoted on a pin $s$, projecting from a base-plate $S^2$, which is secured to the frame A by a cross-bar $A^5$. Rotary motion is imparted to the part S' by means of a crank 8, secured on a shaft $s^6$, which is journaled in bearings on the base-plate $S^2$. A beveled toothed pinion $s^5$ is secured on the shaft $s^6$ and gears into a beveled toothed wheel $s^3$, secured to the said part S' of the table.

Two studs $s'$ are carried by the part S of the table and project through radial slots $s^2$ in the part S'. These studs are preferably provided with antifriction-rollers. The lower end portions of these studs engage with the groove of a guide-ring $S^3$. The groove of this guide-ring has side walls $s^4$, formed concentric with each other, but the outer wall only extends around one-half of the periphery of the inner wall, as shown in Fig. 24.

The guide-ring has an arm $S^4$, provided with slots $s^7$, which slide over clamping-screws $s^8$, projecting from the bearings on the base-plate.

When the guide-ring is concentric with the pin $s$, the part S of the table is revoluble in a circular arc, but when the guide-ring is secured eccentric of the said pin, the pins $s'$ are moved in the radial grooves $s^2$, because one pin or the other is always guided by the walls of the groove of the guide-ring. In this manner eccentric curved lines can be drawn on the paper resting on the part S of the table.

The operation of the machine is as follows: The sheets of paper to be ruled are placed on the table in a pile and the table is moved under the pens, which draw lines on the top sheet of the pile. The sheets are removed one after the other as the ruling on them is finished. In ruling straight lines on the table B the tappet-finger Y is adjusted, so that it lifts the hooked catch J and permits the pens to drop on the paper at the commencement of the lines to be ruled. The lifting of the catch J is accomplished during the rearward movement of the table and while it is moving from the position shown in Fig. 1 toward the pens. After accomplishing its rearward movement the table is moved forward until the tappet X raises the striker and lifts the pens clear of the paper. The pens are held in this raised position by the hooked catch while the table is being pushed back. If broken lines are to be ruled, the tappets $b^2$ are adjusted to raise the pens at the proper places. When the table is pushed back, the tappet-finger Y raises the arm $Q^2$ of the inking mechanism and permits some ink to flow onto the pads before it lifts the hooked catch J. When curved lines are being ruled, the position of the pen-beam remains unaltered. One or more pens are used and they are supported the same as when straight lines are drawn. The rotary table is placed in the frame, so that the pens bear on the paper substantially in a line drawn crosswise of the center upon which the table oscillates. The lateral distance of the pen from the said center determines the size of the curve. The pen is raised and lowered, substantially as hereinbefore described, the tappets X and Y being arranged at the periphery of the table and in the path of the devices which they actuate.

It is obvious that the inking devices and the pen-beam may be operated by hand, whenever desired, both when straight and curved lines are being drawn.

What we claim is—

1. In a ruling-machine, the combination, with a pivoted pen-beam provided with a lug c projecting downward below its pivots, of a hooked catch pivoted to the said lug, and a stationary projection supporting the said catch in a substantially horizontal position, the hooked portion of the said catch operating to engage with the said projection and prevent the descent of the pens when they have been raised above a prearranged height, substantially as set forth.

2. In a ruling-machine, the combination, with a pivoted pen-beam provided with a projecting arm O, and a curved toothed rack carried by the said arm and arranged concentric with the pivots of the beam; of a stationary support, a fly journaled in the said support, and a train of toothed wheels also journaled in the said support and operatively connecting the said rack and fly, substantially as set forth.

3. In a ruling-machine, the combination, with a pivoted pen-beam, of a striker pivoted concentric with the pen-beam, and clutch mechanism connecting the rear end portions of the said beam and striker while the said striker is moving in one direction, constraining the beam to rise when the front end of the striker is raised, but otherwise permitting it to oscillate independent of the striker, substantially as set forth.

4. In a ruling-machine, the combination, with a pivoted pen-beam provided with a quadrant at its rear part, of a pivoted striker for raising the pen-beam, a spring-pressed arm pivoted to the rear part of the striker, and a friction-block carried by the said arm and bearing on the said quadrant, substantially as set forth.

5. In a ruling-machine, the combination, with a pivoted pen-beam, of a striker pivoted concentric with the pen-beam, an adjustable screw arranged between the said beam and striker, thereby determining their relative positions when the striker is moving in one direction, and clutch mechanism operatively connecting the said beam and striker when the said striker is moving in the opposite direction, substantially as set forth.

6. In a ruling-machine, the combination, with a tube for supplying ink to the pen, and a stationary bar $p$; of a spring-guide for the said tube, said guide being formed of a band of metal having its middle portion bent to fit around the tube and having its end portions longitudinally straight and bent transversely so as to be both slidable longitudinally and revoluble axially in a hole in the said bar, and normally retained in position by its own elasticity, substantially as set forth.

7. In a ruling-machine, the combination, with a pivoted pen-beam, and a pen carried thereby; of an arm K' rigidly secured to the said pen-beam over the pen, a downwardly and forwardly inclined arm K pivoted to the said arm K' and provided with a roller at its lower end for bearing on the paper in advance of the pen, and a thumb-screw for clamping the arms together, substantially as set forth.

8. In a ruling-machine, the combination, with a pivoted pen-beam, a pivoted striker for raising the pen-beam, and clutch mechanism connecting the rear end portions of the said beam and striker when the said striker is moving in one direction; of a second pivoted striker for depressing the pen-beam, and clutch mechanism connecting the rear end portions of the said beam and the second pivoted striker in the opposite direction, substantially as set forth.

9. In a ruling-machine, the combination, with a pivoted pen-beam, a hooked catch pivoted to the said beam, and a stationary projection for the said catch to engage with when the pens are raised to a prearranged height; of a movable table, and tappet mechanism carried by the table and operating to raise the said catch and release the pen-beam at the commencement of each line, substantially as set forth.

10. In a ruling-machine, the combination, with an ink-reservoir, and a row of flexible ink-tubes depending vertically therefrom; of a stationary support, a horizontal bar Q carried by the said support and arranged on one side of the said tubes, arms $q$ pivoted to the said support above the bar Q, a horizontal bar Q' carried by the said arms and arranged on the other side of the said tubes from the bar Q', and a weighted arm $q'$ operating to press the bar Q' against all the said tubes, substantially as set forth.

11. In a ruling-machine, the combination, with an ink-reservoir, a tube of flexible material depending therefrom, and automatic clamping-bars normally compressing the tube so that no ink flows through it, one of the said bars being provided with a depending arm; of a movable table, and tappet mechanism carried by the said table and operating the said arm so that ink may flow through the said tube at prearranged intervals of time, substantially as set forth.

12. A pen for ruling broad lines, comprising a plate, and a piece of flexible material stretched over the ruling-point of the plate and secured under tension with its fold pressed against the ruling-point of the plate, substantially as set forth.

13. A pen for ruling broad lines, comprising a plate provided with an enlargement at its ruling-point, and a piece of flexible material stretched over the said enlargement and secured under tension with its fold pressed against the said enlargement of the plate, substantially as set forth.

14. A pen for ruling broad lines, comprising a plate provided with an enlargement at its ruling-point and teeth on its upper side above the said enlargement, and a piece of flexible material having one of its end portions engaging with the said teeth, passing around the said enlargement, and secured under tension with its fold pressed against the enlargement of the said plate, substantially as set forth.

15. In a ruling-machine, the combination, with the two plates forming the penholder, and the adjusting-screws provided with heads fitting loosely in countersunk holes and thereby pivotally connecting the middle portions of the said plates; of an eccentric bar journaled between the rear portions of the said plates and operating to rock one of the said plates upon the said screws, substantially as set forth.

16. In a ruling-machine, the combination, with a penholder, of pads of absorbent material of different width placed one above the other on top of the penholder, and masks arranged over each said pad, each mask being narrower than the pad next below it, substantially as set forth.

17. In a ruling-machine, the combination, with a table, of brackets slidable vertically in the table, a stencil-plate pivotally supported in the said brackets, a shaft supported from the table and provided with an arm for rocking it, arms and links connecting the said shaft with the said brackets, and tappet mechanism operating to turn the stencil-plate on its pivots when the said brackets are raised by the said shaft, substantially as set forth.

18. In a ruling-machine, the combination, with a table, of brackets slidable vertically in the table, a stencil-plate pivotally supported in the said brackets, a shaft supported from the table and provided with an arm for rocking it, fingers projecting from the said shaft and normally clamping the paper against the table, arms and links connecting the said shaft with the said brackets, and tappet mechanism operating to turn the stencil-plate on its pivots when the said brackets and fingers are raised by the said shaft, substantially as set forth.

19. In a ruling-machine, the combination, with a revoluble table formed of two parts superposed one above the other, the lower part having radial slots, and the upper part S having pins projecting through the said slots; of a base-plate provided with a pin supporting the lower part of the table, and a slidably-adjustable guide-ring supported by the said base-plate and provided with a groove with which the said pins engage, substantially as set forth.

20. In a ruling-machine, the combination, with a revoluble table formed of two superposed parts, the lower part having radial slots, and the upper part S having pins projecting through the said slots; of a base-plate provided with a pin supporting the lower part of the table, a shaft provided with means for revolving it and journaled in bearings on the said base-plate, beveled toothed wheels connecting the said shaft with the lower part of the table, a slidably-adjustable guide-ring provided with a groove with which the said pins engage and an arm having longitudinal slots in it and resting on the said bearings, and clamping-screws passing through the said slots and securing the said guide-ring to the base-plate, substantially as set forth.

21. In a ruling-machine the combination with a table for carrying the sheets of paper to be ruled, of a rocking beam carrying the penholder, of a striker operated by adjustable cams mounted on the table for lifting the rocking beam, and of a clutch for communicating the lifting motion only of the striker to the rocking beam, as set forth.

22. In a ruling-machine, the combination with a table for carrying the sheets of paper to be ruled and of a rocking beam for carrying the penholder, of a striker operated by adjustable cams mounted on the table for lifting the rocking beam and of a clutch for communicating the lifting motion only of the striker to the rocking beam and of a fly for controlling the downward movement of the said beam, as set forth.

23. The combination in a ruling-machine, of a table having adjustable cams $b^2$ mounted on it, of a rocking beam C carrying the penholder, of a striker F actuated by the cams $b^2$ and engaging with the rocking beam C by means of a clutch, and of an arm K mounted on the rocking beam and carrying a small roller $k$ adapted to roll on surface of the sheets of paper on the table to relieve the ruling-pens of the weight of the beam, as set forth.

24. The combination in a ruling-machine, of a table having adjustable cams $b^2$ mounted on it, of a rocking beam C carrying the penholder, of a striker F actuated by the cams $b^2$ and engaging with the rocking beam C by means of a clutch, of a fly M for controlling the fall of the beam C, and of an arm K mounted on the rocking beam and carrying a small roller $k$ at its free end, as and for the purpose set forth.

25. The combination in a ruling-machine, of a table, of a rocking beam C adapted to carry the ruling-pens, of a striker F operated by adjustable cams mounted on the table for lifting the rocking beam, of a clutch for communicating the lifting motion only of the striker to the rocking beam and of the device for automatically controlling the flow of the inks to the pens, substantially as hereinbefore described.

26. The combination in a ruling-machine, of a table for carrying the sheets of paper to be ruled of a rocking beam C for carrying the penholder, of a fly M for controlling the fall of the said beam and of the device for automatically controlling the flow of the inks to the pens substantially as hereinbefore described.

27. The combination in a ruling-machine, of a table having adjustable cams $b^2$ mounted on it, of a rocking beam C carrying the penholder, of a striker F actuated by the cams $b^2$ and engaging with the rocking beam C by means of a clutch, and of an arm K mounted on the rocking beam and carrying a small roller $k$, and of the device for automatically controlling the flow of the inks to the pens, as set forth.

28. The combination in a ruling-machine, of a table having adjustable cams $b^2$ mounted on it, of a rocking beam C carrying the penholder, of a striker F actuated by the cams $b^2$ and engaging with the rocking beam C by means of a clutch, of a fly M for controlling the fall of the beam C, and of an arm K mounted on the rocking beam and carrying a small roller $k$ and of the device for automatically controlling the flow of the inks to the pens, as set forth.

29. In a ruling-machine, a pen for ruling broad lines tints and the like consisting essentially of a piece of flannel, felt or other absorbent material of a width equal to the width of the line or tint to be ruled and of a plate or frame over which the absorbent material is laid and stretched as set forth.

30. In a ruling-machine, a pen for ruling broad lines, tints and the like consisting of a plate R having teeth $r'$ cut or formed on its front upturned edge and a longitudinal bar $r^2$ in front of the said teeth, and of a piece of flannel felt or like absorbent material R′ one edge of which engages with the teeth $r'$ on the plate R and the other edge is passed round the bar $r^2$ and stretched over the top face of the plate, as set forth.

31. In a ruling-machine the device for grouping the absorbent ink-pads consisting of a series of plates adapted to cover the ink-pads and each having an opening to expose the pad it covers for the purpose of receiving the supply of ink, the sizes of the said openings in the plates being progressive so that all the pads are exposed in close proximity to one another, as set forth.

32. In a ruling-machine, the combination with the table for carrying the sheets of paper, of a device for carrying a stencil for masking the paper where lines are not to be ruled, consisting essentially of a clamp U adapted to hold the stencil and pivoted to brackets V, V, sliding in vertical slots in the table, of lifting mechanism to raise the said brackets consisting of links $w'$ and $w^2$ of a rocking shaft W of lifting-arm $w$ and of controlling-spring $w^5$, as set forth.

33. In a ruling-machine the combination with the table for carrying the sheets of paper to be ruled, of a device for carrying the stencil for masking the paper where lines are not to be ruled, consisting essentially of a clamp U adapted to hold the stencil and pivoted to brackets V, V sliding in vertical slots in the table, of lifting mechanism to raise the said brackets consisting of links $w'$ and $w^2$, of a rocking shaft W, of lifting-arm $w$, of controlling-spring $w^5$ and of the holders or fingers $w^4$ for gripping the sheets of paper on the table and holding them against the stops $b$, as set forth.

ELLIS GRABER.
LEWIS HEPWORTH.

Witnesses:
ROBERT E. PHILLIPS,
W. H. JAMES.